US009840896B2

(12) United States Patent
Britton et al.

(10) Patent No.: US 9,840,896 B2
(45) Date of Patent: Dec. 12, 2017

(54) ACID SOLUBLE ABRASIVE MATERIAL AND METHOD OF USE

(71) Applicant: Thru Tubing Solutions, Inc., Oklahoma City, OK (US)

(72) Inventors: Mark Britton, Carter, OK (US); Roger Schultz, Ninnekah, OK (US)

(73) Assignee: Thru Tubing Solutions, Inc., Oklahoma City, OK (US)

( * ) Notice: Subject to any disclaimer, the term of this patent is extended or adjusted under 35 U.S.C. 154(b) by 147 days.

(21) Appl. No.: 13/865,610

(22) Filed: Apr. 18, 2013

(65) Prior Publication Data

US 2014/0083709 A1    Mar. 27, 2014

Related U.S. Application Data

(60) Provisional application No. 61/704,150, filed on Sep. 21, 2012, provisional application No. 61/733,947, filed on Dec. 6, 2012.

(51) Int. Cl.
| | |
|---|---|
| *E21B 43/26* | (2006.01) |
| *E21B 43/114* | (2006.01) |
| *C09K 8/74* | (2006.01) |
| *C09K 8/72* | (2006.01) |
| *C09K 8/42* | (2006.01) |
| *C09G 1/02* | (2006.01) |

(52) U.S. Cl.
CPC ............... *E21B 43/26* (2013.01); *C09G 1/02* (2013.01); *C09K 8/426* (2013.01); *C09K 8/72* (2013.01); *C09K 8/74* (2013.01); *E21B 43/114* (2013.01)

(58) Field of Classification Search
None
See application file for complete search history.

(56) References Cited

U.S. PATENT DOCUMENTS

| | | | | |
|---|---|---|---|---|
| 2,265,962 | A * | 12/1941 | Bent et al. | 166/281 |
| 2,772,739 | A * | 12/1956 | Brakel et al. | 166/292 |
| 3,175,613 | A * | 3/1965 | Parker | E21B 43/114 166/298 |
| 3,208,533 | A * | 9/1965 | Corley, Jr. | 166/205 |
| 4,141,843 | A * | 2/1979 | Watson | 507/207 |
| 4,527,627 | A | 7/1985 | Graham et al. | |
| 4,621,692 | A * | 11/1986 | Mondshine | C09K 8/572 166/278 |
| 4,875,525 | A * | 10/1989 | Mana | 166/280.2 |
| 5,325,921 | A * | 7/1994 | Johnson et al. | 166/280.1 |
| 5,366,015 | A * | 11/1994 | Surjaatmadja | B24C 1/003 166/298 |
| 5,765,642 | A * | 6/1998 | Surjaatmadja | E21B 43/26 166/177.5 |
| 6,032,741 | A * | 3/2000 | Johnson | 166/312 |
| 6,440,377 | B1 | 8/2002 | Auer et al. | |
| 7,766,083 | B2 * | 8/2010 | Willett | E21B 43/114 166/280.1 |
| 2005/0130848 | A1* | 6/2005 | Todd et al. | 507/200 |
| 2005/0230107 | A1* | 10/2005 | McDaniel et al. | 166/249 |
| 2006/0118301 | A1* | 6/2006 | East, Jr. | E21B 43/114 166/280.2 |
| 2008/0196895 | A1 | 8/2008 | Watters et al. | |
| 2009/0025934 | A1 | 1/2009 | Hartman et al. | |
| 2009/0084554 | A1* | 4/2009 | Williamson et al. | 166/308.4 |
| 2010/0200235 | A1* | 8/2010 | Luo et al. | 166/284 |
| 2010/0212897 | A1* | 8/2010 | Nguyen | E21B 43/267 166/280.1 |
| 2012/0061082 | A1* | 3/2012 | Jensen | 166/305.1 |

OTHER PUBLICATIONS

Material Safety Data Sheet; Calcium Carbonate MSDS; ScienceLab.com; May 2013; pp. 1-5.*

* cited by examiner

*Primary Examiner* — Anuradha Ahuja
(74) *Attorney, Agent, or Firm* — Hall Estill Law Firm

(57) ABSTRACT

A method of treating a formation, a wellbore, or equipment in a wellbore is disclosed herein. The method includes introducing a soluble abrasive material into a wellbore for various oil and gas operations. The method also includes introducing an acidic solution into the wellbore to dissolve at least a portion of the soluble abrasive material to allow for more efficient removal of the soluble abrasive material from the wellbore.

8 Claims, No Drawings

ACID SOLUBLE ABRASIVE MATERIAL AND METHOD OF USE

CROSS-REFERENCE TO RELATED APPLICATIONS

The present application is a conversion of U.S. Provisional Application having U.S. Ser. No. 61/704,150, filed Sep. 21, 2012, and U.S. Provisional Application having U.S. Ser. No. 61/733,947, filed Dec. 6, 2012, which claims the benefit under 35 U.S.C. 119(e), the disclosures of which are hereby expressly incorporated herein by reference.

STATEMENT REGARDING FEDERALLY SPONSORED RESEARCH OR DEVELOPMENT

Not applicable.

BACKGROUND OF THE INVENTION

In standard abrasive perforating operations, a hard material such as sand is typically used as an abrasive media which is mixed into a liquid slurry and pumped through a workstring from the surface to a downhole nozzle which creates a high-velocity jet. The high-velocity jet accelerates the particles in the slurry to create perforation tunnels through the casing and out into the formation to allow fluid to be pumped into the formation (such as fracking), or to allow hydrocarbon production from the reservoir into the casing. Typically, the abrasive material used is returned to the surface by being pumped up the annulus between the supply tubular and the casing. In order for the solid material to be effectively carried to the surface, the annular flow velocity must be sufficient to suspend and transport the solid material. In some cases, the annular velocity is not sufficient to carry the solid material to the surface and the solid material will build up in the annulus. This buildup can cause tubing to become stuck in the wellbore and it can cause downhole tools to malfunction by affecting the movement of the downhole tools' components.

Accordingly, there is a need for an abrasive material that can be more easily lifted and/or removed from the wellbore after abrasive perforating operations have been concluded.

SUMMARY OF THE INVENTION

The present disclosure relates to a method of using an abrasive slurry in downhole oil and gas operations. The method includes introducing an abrasive slurry into a wellbore. The abrasive slurry is a mixture of a soluble abrasive material and a carrier fluid for transporting the abrasive material down into the wellbore. The wellbore provides access to portions of an oil or gas formation. The method also includes introducing an acidic solution into the wellbore to dissolve a portion of the soluble abrasive material introduced into the wellbore in the abrasive slurry.

The present disclosure also relates to an abrasive slurry that is used in downhole oil and gas operations. The slurry includes a soluble abrasive material, a non-soluble abrasive material, and a carrier fluid for transporting the abrasive materials into the wellbore.

DETAILED DESCRIPTION OF THE INVENTION

The present disclosure relates to an abrasive material soluble in an acidic solution used in oil and gas operations, including abrasive perforating operations. In abrasive perforating operations, the abrasive material is mixed with a carrier fluid to create an abrasive slurry and can then be delivered to the formation. The disclosure also relates to methods of removing the abrasive material from the wellbore and from downhole equipment, such as downhole tubing, downhole tools, and the like, where the abrasive material has built up.

The abrasive material can be any material known in the art that is capable of perforating casing and oil and gas formations, and be at least partially soluble in an acidic solution. The acidic solution can be any solution containing any amount of an acid that can at least partially dissolve the abrasive material. An example of an acid that can be used to create the acidic solutions includes, but is not limited to hydrochloric acid. Additionally, the carrier fluid can be any substance capable of performing the perforation applications and carrying the abrasive material through the drill string into the formation and back to the surface. In one embodiment, the abrasive material can be calcium carbonate.

In one embodiment, a bottom hole assembly (BHA) can be conveyed into a well, via tubing. The BHA includes a packer, which is designed so that every other time the tubing is moved in the downhole direction, the packer will "set", creating a seal between the tubing string and casing ID. In-between "sets", the packer can be moved downhole without setting. The packer will be set below a zone to be treated. The abrasive slurry can then be pumped down to the BHA. The abrasive slurry will then be ejected through the high velocity nozzles in the perforating tool causing high pressure jets which will create perforations through the casing and into the formation. During the perforating process, the abrasive slurry will flow up the annulus to the surface. If the packer, or any other BHA component becomes stuck due to the abrasive material, an acid solution will be pumped to the BHA causing the material to dissolve, releasing the stuck component. Additionally, if the annular velocity is not sufficient to lift the abrasive material to the surface, acid can be circulated to dissolve and remove the solid material.

Various methods are contemplated in this disclosure. In one embodiment, a well is perforated with the abrasive material. In another embodiment, the acidic solution is introduced to the well to dissolve at least a portion of the abrasive material for a variety of reasons. For example, the acidic solution can be introduced to dissolve at least a portion of the abrasive material to remove buildup of the abrasive material, to reduce the amount of abrasive material in the abrasive slurry and facilitate the flow of the abrasive slurry to the surface, and/or to release at least one component of a downhole tool which may be inoperable due to accumulation of the abrasive material.

In a further embodiment, a plug is formed in the wellbore below the perforations with the abrasive material. Once the plug is formed, the interval of the formation that was plugged can then be fractured to open the formation and release hydrocarbons. The acidic solution can then be introduced to the formation to remove any plugs that were formed from the abrasive material.

In yet another embodiment, a BHA can be positioned at a predetermined location in the wellbore prior to perforating the wellbore with the abrasive slurry. The acidic solutions can then be pumped downhole to dissolve at least a portion of the abrasive material. The formation can then be fractured and an additional amount of the acidic solution can be pumped downhole to dissolve a further amount of the abrasive material.

In another embodiment of the present disclosure, an abrasive material mixture can be mixed with the carrier fluid to create the abrasive slurry. The abrasive material mixture can be a mixture of a soluble abrasive material and non-soluble abrasive material. The soluble abrasive material is an abrasive material that is at least partially soluble in an acidic solution. The non-soluble abrasive material is an abrasive material that is substantially not soluble in an acidic solution. It should be understood and appreciated that the abrasive material mixture can be used in the same way as the abrasive material described above.

In another embodiment, a first abrasive slurry can be made with the soluble abrasive material and used in wellbore applications/operations disclosed herein. The first abrasive slurry can be followed with a second abrasive slurry. The second abrasive slurry is made with the non-soluble abrasive material.

The soluble abrasive material can be any material capable of performing the functions required by the operating parameters herein (i.e., perforating operations, fracking operations, plugging operations, etc.). In one embodiment, the soluble abrasive material includes, but is not limited to calcium carbonate.

The non-soluble abrasive material can be any material capable of performing the functions required by the operating parameters herein. In one embodiment, the non-soluble abrasive material includes, but is not limited to sand, gypsum, any kind of silica-based products, and a combination thereof.

The amount of non-soluble abrasive material included in the abrasive material mixture can be any amount such that the abrasive material mixture is effective in performing the functions required by the operating parameters herein. In one embodiment, the ratio of the amount of non-soluble abrasive material to the soluble abrasive material is in a range of from about 3.0 wt. percent to about 50 wt. percent. In another embodiment, the ratio of the amount of non-soluble abrasive material to the soluble abrasive material is in a range of from about 7.0 wt. percent to about 35 wt. percent. In yet another embodiment, the ratio of the amount of non-soluble abrasive material to the soluble abrasive material is in a range of from about 10 wt. percent to about 20 wt. percent.

In a further embodiment of the present disclosure, acid or acidic solutions can be added to the abrasive slurry to generate non-soluble abrasive material in the abrasive slurry. The acid or acidic solution can convert the soluble abrasive material into non-soluble abrasive material. It should be understood that if the abrasive slurry initially has no non-soluble abrasive material, then adding the acid or acidic solution would generate some non-soluble abrasive material in the abrasive slurry. If the abrasive slurry already contained some amount of non-soluble abrasive material, then the addition of the acid or acidic solution to the abrasive slurry would generate more non-soluble abrasive material than was already present. In one exemplary embodiment, sulfuric acid can be added to an abrasive slurry wherein the abrasive material is calcium carbonate (soluble abrasive material). When the sulfuric acid is added to the abrasive slurry, the soluble abrasive material (calcium carbonate) is converted to gypsum (non-soluble abrasive material).

From the above description, it is clear that the present disclosure is well adapted to carry out the objectives and to attain the advantages mentioned herein as well as those inherent in the disclosure. While presently preferred embodiments of the invention have been described for purposes of this disclosure, it will be understood that numerous changes may be made which will readily suggest themselves to those skilled in the art and which are accomplished within the spirit of the disclosure.

What is claimed is:

1. A method, the method comprising:
performing a perforation operation by introducing an abrasive slurry through a perforating tool with high velocity nozzles thereby perforating an oil and gas formation intersected by a wellbore and creating perforations in the oil and gas formation that are fractured by a separate fracturing operation;
wherein
the abrasive slurry is a mixture of a soluble abrasive material, a non-soluble abrasive material and a carrier fluid for transporting the abrasive materials down into the wellbore,
the soluble abrasive material is soluble in an acidic solution, the non-soluble abrasive material is not soluble in the acidic solution and the wellbore provides access to portions of the oil and gas formation, and
the ratio of the amount of non-soluble abrasive material to the soluble abrasive material in the abrasive slurry is in a range of from about 10.0 weight percent to about 20 weight percent; and
introducing the acidic solution into the wellbore to dissolve a portion of the soluble abrasive material introduced into the wellbore in the abrasive slurry.

2. The method of claim 1 wherein the soluble abrasive material is calcium carbonate.

3. The method of claim 1 wherein the acidic solution includes hydrochloric acid to dissolve a portion of the soluble abrasive material.

4. The method of claim 1 further comprising fracturing a portion of the formation with the abrasive slurry prior to introducing the acidic solution and introducing a second acidic solution to the wellbore to dissolve a further amount of the soluble abrasive material.

5. The method of claim 1 wherein the non-soluble abrasive material is selected from the group consisting of sand, gypsum, silica-based products, and a combination thereof.

6. The method of claim 1 further comprising a step of introducing a second abrasive slurry into the wellbore wherein the second abrasive slurry includes non-soluble abrasive material that is insoluble in the acidic solution.

7. The method of claim 1 wherein a second acidic solution is introduced into the wellbore to interact with the soluble abrasive material to convert a portion of the soluble abrasive material to a non-soluble abrasive material that is insoluble in the acidic solution.

8. The method of claim 7 wherein the soluble abrasive material is calcium carbonate and the second acidic solution is sulfuric acid, which converts the calcium carbonate to gypsum.

* * * * *